US007383275B2

(12) United States Patent
Chen et al.

(10) Patent No.: US 7,383,275 B2
(45) Date of Patent: Jun. 3, 2008

(54) METHODS TO IMPROVE INDEXING OF MULTIDIMENSIONAL DATABASES

(75) Inventors: Ying Chen, Beijing (CN); Fang Yan Rao, Beijing (CN); Knut Stolze, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 10/144,058

(22) Filed: May 10, 2002

(65) Prior Publication Data

US 2003/0212689 A1 Nov. 13, 2003

(51) Int. Cl.
*G06F 17/30* (2006.01)

(52) U.S. Cl. .......................................................... 707/102

(58) Field of Classification Search .................. 707/102, 707/1–10, 100–104.1; 345/423
See application file for complete search history.

(56) References Cited

U.S. PATENT DOCUMENTS

| | | | | |
|---|---|---|---|---|
| 5,745,899 A | | 4/1998 | Burrows | 707/102 |
| 5,781,899 A | | 7/1998 | Hirata | |
| 5,832,475 A | | 11/1998 | Agrawal et al. | |
| 5,845,277 A | * | 12/1998 | Pfeil et al. | 707/3 |
| 5,895,467 A | | 4/1999 | Ubell et al. | |
| 5,963,956 A | * | 10/1999 | Smartt | 707/104.1 |
| 6,014,614 A | | 1/2000 | Herring et al. | |

(Continued)

FOREIGN PATENT DOCUMENTS

| | | |
|---|---|---|
| WO | WO 01/33395 | 10/2000 |
| WO | WO 01/33395 | 5/2001 |

OTHER PUBLICATIONS

Mohamed Morkbel et al., Irregularity in multi–dimensional space–filling curves with applications in multidimensional databases, 2001, ACM Press, Session: multimedia information processing, Atlanta, GA, pp. 512–519.*

J. Nievergelt et al., The Grid File:An Adaptable, Symmetric Multikey File Structure, (Mar. 1984) ACM Transaction on Databa Systems, ACM Press, pp. 38–71.*

H. Samet. *Spatial Data Structures*, Modern Database Systems: The Object Model, Interoperability, and Beyond, W. Kim, ed., Addison Wesley/ACM Press, Reading, MA, 1995, 361–385.Computer Science Department and Institute of Advanced Computer Studies and Center for Automation Research, University of Maryland, College Park, MD 20742.

S. Acharya et al., *Selectivity Estimation in Spatial Databases*, Proceedings of ACM SIGMOD Conference, Philadelphia, Jun. 1999, Information Sciences Research Center Bell Laboratories, Lucent Technologies, 600 Mountain Ave, Murray Hill, NJ, USA, 12 pages.

A. Aboulnaga, et al., *Accurate Estimation of the Cost of Spatial Selections*, Computer Sciences Department University of Wisconsin—Madison.

(Continued)

*Primary Examiner*—Diane D. Mizrahi
(74) *Attorney, Agent, or Firm*—Konrad Raynes & Victor LLP; Janaki K. Davda

(57) ABSTRACT

Systems, methods, and computer products that improve the techniques used to search multidimensional databases over techniques of the past. The preferred embodiment of the present invention advantageously improves the technique of determining a grid index that is used to locate a geometric shape in a spatial database. More particularly, the preferred embodiment of the present invention improves the technique of defining the grid cell size in a grid for a given data set, thereby improving the grid indexing process that locates a particular minimum-bounding rectangle and the associated geometric shape.

8 Claims, 8 Drawing Sheets

U.S. PATENT DOCUMENTS

| | | | | | |
|---|---|---|---|---|---|
| 6,021,409 | A | | 2/2000 | Burrows | 707/102 |
| 6,038,258 | A | | 3/2000 | Chun et al. | 375/240 |
| 6,101,492 | A | | 8/2000 | Jacquemin | 707/3 |
| 6,122,628 | A | | 9/2000 | Castelli | 707/5 |
| 6,134,541 | A | | 10/2000 | Castelli et al. | |
| 6,154,748 | A | | 11/2000 | Gupta et al. | 707/102 |
| 6,195,659 | B1 | | 2/2001 | Hyatt | |
| 6,201,884 | B1 | | 3/2001 | Van Bemmel et al. | 382/109 |
| 6,219,662 | B1 | | 4/2001 | Fuh et al. | |
| 6,223,182 | B1 | | 4/2001 | Agarwal et al. | |
| 6,233,571 | B1 | | 5/2001 | Egger et al. | |
| 6,253,196 | B1 | | 6/2001 | Fuh et al. | |
| 6,266,663 | B1 | | 7/2001 | Fuh et al. | |
| 6,308,177 | B1 | * | 10/2001 | Israni et al. | 707/100 |
| 6,338,056 | B1 | | 1/2002 | Dessloch et al. | 707/2 |
| 6,353,832 | B1 | | 3/2002 | Acharya et al. | |
| 6,439,783 | B1 | | 8/2002 | Antoshenkov | |
| 6,460,026 | B1 | | 10/2002 | Pasumansky | |
| 6,484,179 | B1 | | 11/2002 | Roccaforte | |
| 6,505,205 | B1 | | 1/2003 | Kothuri et al. | |
| 6,510,435 | B2 | | 1/2003 | Bayer | |
| 6,611,609 | B1 | | 8/2003 | Zhu | |
| 6,636,849 | B1 | | 10/2003 | Tang et al. | |
| 6,636,870 | B2 | * | 10/2003 | Roccaforte | 707/101 |
| 6,687,701 | B2 | | 2/2004 | Karamanolis et al. | |
| 6,700,574 | B1 | * | 3/2004 | Song | 345/423 |
| 6,711,563 | B1 | | 3/2004 | Koskas | |
| 6,732,120 | B1 | | 5/2004 | Du | |
| 6,778,996 | B2 | | 8/2004 | Roccaforte | |
| 6,831,668 | B2 | | 12/2004 | Cras et al. | |
| 6,915,289 | B1 | | 7/2005 | Malloy et al. | |
| 6,922,700 | B1 | | 7/2005 | Aggarwal et al. | |
| 6,959,304 | B1 | | 10/2005 | Teig et al. | |
| 7,016,911 | B2 | | 3/2006 | Bousfield | |
| 7,197,500 | B1 | | 3/2007 | Israni et al. | |
| 2002/0035432 | A1 | | 3/2002 | Kubica et al. | |
| 2002/0095421 | A1 | | 7/2002 | Koskas | |
| 2002/0129032 | A1 | * | 9/2002 | Bakalash et al. | 707/101 |
| 2002/0156779 | A1 | | 10/2002 | Elliot et al. | |
| 2002/0184187 | A1 | * | 12/2002 | Bakalash et al. | 707/1 |
| 2002/0188581 | A1 | | 12/2002 | Fortin et al. | |
| 2003/0126143 | A1 | | 7/2003 | Roussopoulos et al. | |
| 2003/0187867 | A1 | | 10/2003 | Smartt | |
| 2003/0212689 | A1 | | 11/2003 | Chen et al. | |
| 2004/0019581 | A1 | | 1/2004 | Davis, II et al. | |
| 2004/0036688 | A1 | | 2/2004 | Cutlip | |
| 2004/0117358 | A1 | | 6/2004 | von Kaenel et al. | |
| 2004/0225665 | A1 | | 11/2004 | Toyama et al. | |
| 2005/0137994 | A1 | | 6/2005 | Fortin et al. | |
| 2006/0069635 | A1 | * | 3/2006 | Ram et al. | 705/37 |
| 2006/0129529 | A1 | * | 6/2006 | Adler | 707/3 |

OTHER PUBLICATIONS

B. Pagel, et al., *Towards on Analysis of Range Query Performance in Spatial Data Structures*, 8 pages.

V. Gaede, *Multidimensional Access Methods*. Volker Gaede Imperial College, London, UK and Oliver Gunther, Humboldt–Universitat. Berlin, Germany.

Judith R. Davis, *IBM's DB2 Spatial Extender: Managing Geo–Spatial Information within the DBMS*, May 1998, pp. 1–23.

Gunther, O., "The Cell Tree. An Index for Geometric Databases," Informatik Forschung und Enwicklung, vol. 4, no. 1, pp. 1–13, 1989, Abstract.

Philip S Yu, et al, "System and Method for Similarity Indexing and Searching in High Dimensional Space" U.S. Appl. No. 09/571,471, filed May 16, 2000, Assignee International Business Machines Corporation.

*Storing and Manipulating Gridded Data in Database*, Barrodale Computing Services Ltd. (BCS), Victoria BC Canada V8W 3W2, http://www.barrodale.com/grid_Demo/gridInfo.pdf.

Sharing Geographic Knowledge, *Moving from a single user datatbase to multi–user ArcSDE and the Geodatabase, Session 1*, ESRI 19$^{th}$ Annual User Conference, http://www.esri.com/devsupport/devconn/sde/presentations/tw501.pdf.

Sharing Geographic Knowledge, *ArcSDE Performance Tips*, ESRI 19$^{th}$ Annual User Conference, http://www.esri.com/devsupport/devconn/sde/presentatons/tw502.pdf.

Harley, Mark, *ArcSDE Tuning—Tips and Tradeoffs*, http:/gis.esri.com/library/userconf/proc01/professional/papers/pap869/p869.htm.

Adler, D.W., et al. U.S. Appl. No. 10/792,446, filed on Mar. 21, 2004, entitled "*Index Exploitation for Spatial Data.*" Assignee International Business Machines Corporation.

U.S. Appl. No. 10/144,389, filed on May 10, 2002, entitled *Systems, Methods, and Computer Program Products to Reduce Computer Processing in Grid Cell Size Determination for Indexing of Multidimensional Databases*, by K. Stolze; F.Y. Rao; and Y. SD Chen.

Adler, D., et al. U.S. Appl. No. 10/141,919 entitled "*Reducing Index Size for Multi–Level Grid Indexes*," filed on May 10, 2002. Assignee International Business Machines Corporation.

Aref, W., et al. Geoinformatica. *Efficient Window Block Retrieval in Quadtree–Based Spatial Databases*, Apr. 1997, pp. 1–37.

Shekhar, S. and S. Chawla. *Spatial Databases. A Tour* (Cover Page, Copyright Page, Table of Contents and pp. 96–100). New Jersey:Pearson Education, Inc., 2003.

Rigaux, P., et al. *Spatial Databases with Application to GIS* (Cover Page, Copyright page, Table of Contents and pp. 209–219). San Diego,CA:Academic Press, 2002.

IBM, Corp. "IBM® DB2® *Spatial Extender. User's Guide and Reference, Version 7*," Second Edition, (Jun. 2001), 373 pages.

Hutflesz, A., H. Six, and P. Widmayer, "Twin Grid Files: Space Optimizing Access Schemes", ACM Sigmod Record, vol. 17, Iss. 3, pp. 183–190, 1988.

* cited by examiner

METHODS TO IMPROVE INDEXING OF MULTIDIMENSIONAL DATABASES

CROSS REFERENCE TO RELATED APPLICATIONS

Co-pending U.S. application Ser. No. 10/141,919, entitled "Reducing Index Size for Multi-Level Grid Indexes," filed on the same date herewith, by David Adler et al., assigned to the assignee of the present invention, contains subject matter related, in certain respect, to the subject matter of the present invention, and is incorporated herein in its entirety by this reference.

Co-pending U.S. application Ser. No 10/144,389, entitled "Systems, Methods, and Computer Program Products to Reduce Computer Processing in Grid Cell Size Determination for Indexing of Multidimensional Databases," filed on the same date herewith, by Ying Chen et al., assigned to the assignee of the present invention, contains subject matter related, in certain respect, to the subject matter of the present invention, and is incorporated herein in its entirety by this reference.

BACKGROUND OF THE INVENTION

1. Field of the Invention

The present invention is directed to the field of indexing computer-based multidimensional data. It is more particularly directed to improving the determination of the grid cell size when grid-indexing techniques are applied to multidimensional data on a computer system.

2. Description of the Background Art

Indexing techniques are used to quickly access data that is sorted. Spatial data is typically information associated with geometric shapes such as lines, points, poly-lines, polygons, and surfaces. Spatial data is often very large and may have two, three, or more dimensions. Spatial data may be indexed. Indexing such data by traditional techniques, such as a B-tree, may not be feasible due to the large amount of computer resources required to index spatial data. Further, B-tree indexing is typically associated with single-dimensional data, not multidimensional data. Therefore, sorting capabilities associated with B-tree indexing are typically not sufficient to be efficiently applied to multidimensional data. To reduce data processing time, various spatial indexing techniques have been studied and developed. Grid indexing is one of these indexing techniques associated with searching spatial multidimensional data, and is used by the product marketed under the trademark IBM DB2® Spatial Extender.

The grid cell size used in grid indexing strongly affects the efficiency of accessing spatial data by techniques that employ grid indexing. A problem has been to efficiently determine an improved grid cell size for a grid associated with a given spatial data set. An optimal relationship between a geometric shape and a grid cell is a one-to-one relationship in which each geometric shape overlaps only one grid cell, and each grid cell includes at most one geometric shape. This optimal relationship simplifies searching for a particular geometric shape by simplifying the process of sorting and accessing spatial data via grid indexing. By means of an example, if the grid cell size is too large, many geometric shapes may overlap with one grid cell and identification of a particular geometric shape is difficult due to the lack of a one-to-one association between a grid cell and a geometric shape. On the other hand, if the grid cell size is too small then a geometric shape overlaps many grid cells and it becomes quite difficult to quickly access the geometric shape by spatial indexing. Those skilled in the art will appreciate the technique of accessing spatial data by determining overlap of a geometric shape with a grid cell.

A geometric shape that is typically the subject of spatial data may be approximated by a rectangle. When a rectangle bounds the geometric shape with a minimum enclosure, it is referred to as a "minimum-bounding rectangle." When a minimum-bounding rectangle has been defined and approximates a geometric shape that is located in space, coordinates located on a grid that represent the location of the minimum-bounding rectangle may be used to reference the minimum-bounding rectangle and the approximated geometric shape. For example, the coordinates on a grid that correspond to the corners of the minimum-bounding rectangle may be stored and used to reference the minimum-bounding rectangle.

An index enables fast access of a certain subset of data contained in a larger set of data. The index comprises a data structure and the techniques used to build, maintain, and search the data structure for the purpose of accessing a subset of data. For example, an index may define a data structure that is used to access a specific geometric shape included in a set of spatial data. The particular index of the present example may define a data structure that contains references to the minimum-bounding rectangles associated with various geometric shapes in a spatial data set. By accessing locator references associated with the minimum-bounding rectangles the process of accessing particular geometric shapes in a spatial data set is simplified.

Techniques of the past have typically required significant resources to locate a geometric shape in a spatial database. The lack of an efficient process for determining an index that facilitates streamlined location of minimum-bounding rectangles, and the associated geometric shapes, has contributed to inefficient access of information in spatial databases with grid indexing. More particularly, a problem has been to efficiently define the grid cell size in a grid for a given data set so that the technique of grid indexing that locates a particular minimum-bounding rectangle is sufficiently efficient. From the foregoing it will be apparent that there is still a need to improve the determination of the grid cell size when grid-indexing techniques are applied to spatial data on a computer system.

SUMMARY OF THE INVENTION

An embodiment of the present invention relates to systems, methods, and computer products that improve the techniques used to search multidimensional databases over techniques of the past. A problem has been that significant resources were required to locate a geometric shape in a spatial database. The preferred embodiment of the present invention advantageously improves the technique of determining an index that is used to locate a geometric shape in a spatial database. More particularly, the preferred embodiment of the present invention improves the technique of defining the grid cell size in a grid for a given data set, thereby improving the grid-indexing process that locates a particular minimum-bounding rectangle and the associated geometric shape.

The preferred embodiment of the present invention improves the determination of grid indexes that are used to search a spatial database. An embodiment of the present invention determines an index performance indicator, "Ne," to evaluate the grid index performance. By evaluating the grid index performance the present invention provides a technique for improving searches that use indexing techniques and operate on databases that may include spatial data.

The techniques of the present invention are especially advantageous when applied to grid-indexing techniques that are associated with geometric shapes that are represented by spatial data in spatial databases. However, the present invention is not restricted to techniques applied to spatial databases and can be used with techniques for searching other multidimensional databases.

The preferred embodiment of the present invention improves techniques of the past that were used to determine the grid cell size and that facilitate efficient indexing of a spatial database. More particularly, a minimum value of the index performance indicator is determined by the preferred embodiment of the present invention and is the minimum number of index entries that must be evaluated during a search for a geometric shape associated with a spatial database. The minimum value of the index performance indicator further represents the minimum number of grid cells that overlap with any particular geometric shape. Once the minimum number of index entries is determined a grid can be partitioned into the appropriate number of grid cells to support efficient grid indexing.

The index performance indicator is determined by generating and processing statistics associated with the spatial data. The preferred embodiment of the present invention constructs and maintains indexes by use of a key generator function, that is a user-defined structured query language (SQL) statement. SQL is a standardized language for defining and manipulating data in a relational database. This statement generates index information similar to, or identical to, information used during the original construction and subsequent maintenance of the database. The index information generated by the SQL statement may be used to determine the minimum index performance indicator.

An embodiment of the present invention is achieved by systems, methods, and computer products that determine an improved grid cell size by first determining the minimum index performance indicator that is used to improve grid indexing when searching a multidimensional database. The method comprises: (a) sampling the grids; (b) determining the quality of a sample of geometric shape information by: (i) collecting statistics and (ii) determining Ne; and (c) determining the minimum Ne and the corresponding grid cell size. The grid cell size may be determined by use of a query box. It will be appreciated that the method described herein is exemplary and other equivalent methods that determine Ne, and more particularly the minimum value of Ne, in order to determine the grid cell size may be used to practice the present invention.

A technique for partitioning space into grids, for the purpose of accessing spatial multidimensional data, may include ascribing different levels to the partitioned space. The plurality of levels may represent partitions of the space in varying levels of granularity. The preferred embodiment of the present invention novelly operates on a plurality of such levels.

Other aspects and advantages of the present invention will become apparent from the following detailed description, taken in conjunction with the accompanying drawings, illustrating by way of example the principles of the invention.

BRIEF DESCRIPTION OF THE DRAWINGS

In the following detailed description and in the several figures of the drawings, like elements are identified with like reference numerals.

FIG. 1 includes FIG. 1A and FIG. 1B;

DESCRIPTION OF THE INVENTION

Figure 1A:
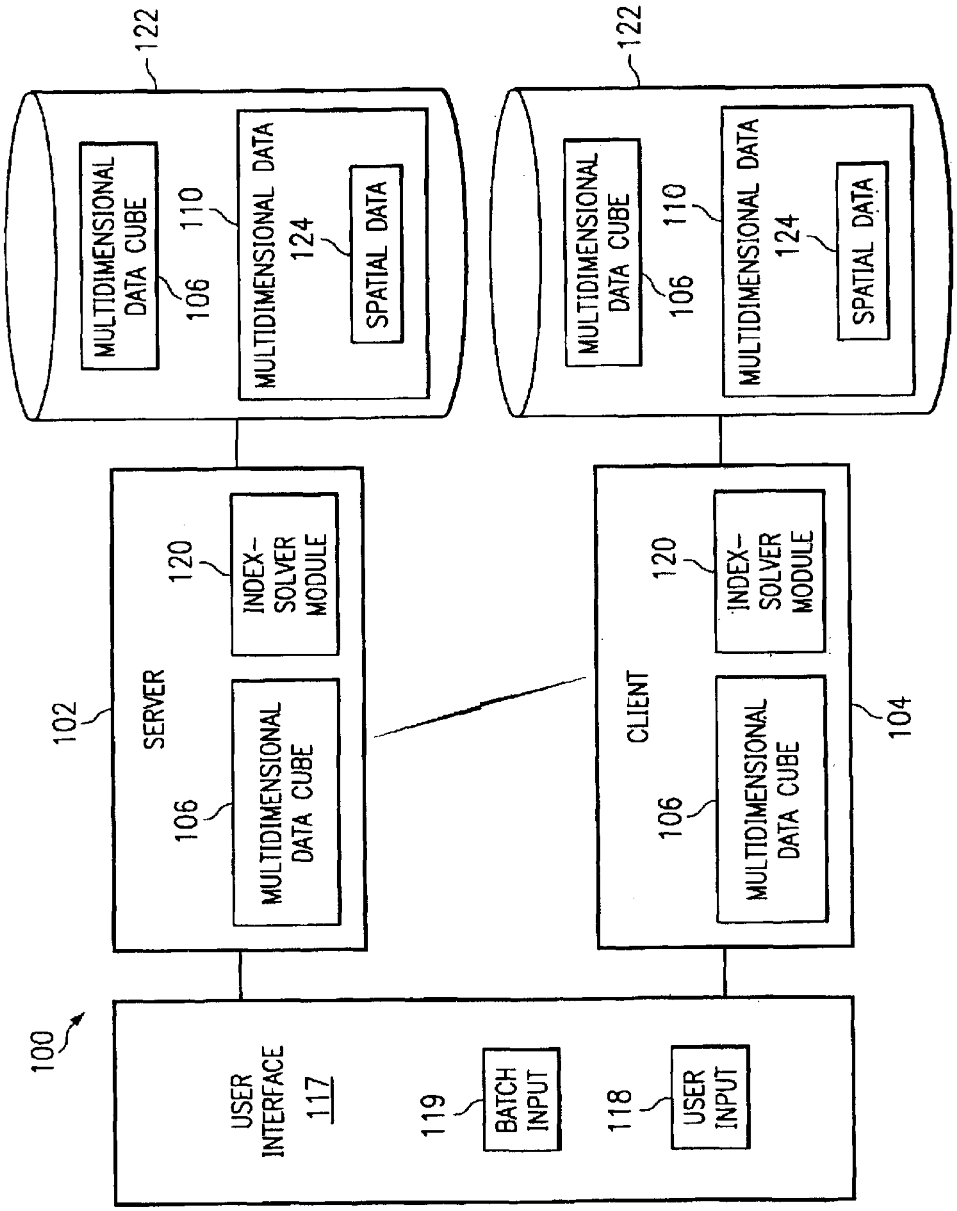
FIG. 1A is a block diagram that illustrates the present invention.

As shown in the drawings and for purposes of illustration, the preferred embodiment of the invention novelly improves the techniques used to search multidimensional databases over techniques of the past. A problem has been that significant resources were required to locate a geometric shape in a spatial database. The preferred embodiment of the present invention advantageously improves the technique of determining an index that is used to locate a geometric shape in a spatial database. More particularly, the preferred embodiment of the present invention improves the technique of defining the grid cell size in a grid for a given data set, thereby improving the grid-indexing technique that locates a particular minimum-bounding rectangle and the associated geometric shape.

As shown in FIG. 1A and in element 100, the preferred embodiment of the present invention may operate in a client-server computer system configuration. Therefore, a client computer system 104 may communicate with a server computer system 102 during the operation of the present invention. The index-solver module 120 operates in either the client 104 or the server 102 to perform the preferred embodiment of the present invention. For example, information may be communicated to either the server 102 or the client 104 via the user interface 117 and may subsequently be used by the index-solver module 120 to determine the size of the grid 148 that will enable efficient grid-indexing searches of spatial multidimensional data 110. The preferred embodiment operates on the server 102 since the client 104 is typically smaller than the server 102 and may not be sufficiently robust to handle the computer resource requirements associated with practicing the preferred embodiment of the present invention. The user interface 117 may communicate with the preferred embodiment of the present invention, either via batch input 119 or user input 118. Element 148 is described with reference to FIG. 1B.

Further, a multidimensional data cube 106 may be configured in the memory 458 of either the client 104 or the server 102. Alternatively, the multidimensional data cube 106 may be configured in computer storage such as that of a disk 122.

Spatial data 124 is a specific type of multidimensional data 110. The terms "multidimensional data cube" and "multidimensional database" will be used interchangeably herein. Element 458 is described with reference to FIG. 4.

Figure 1B:
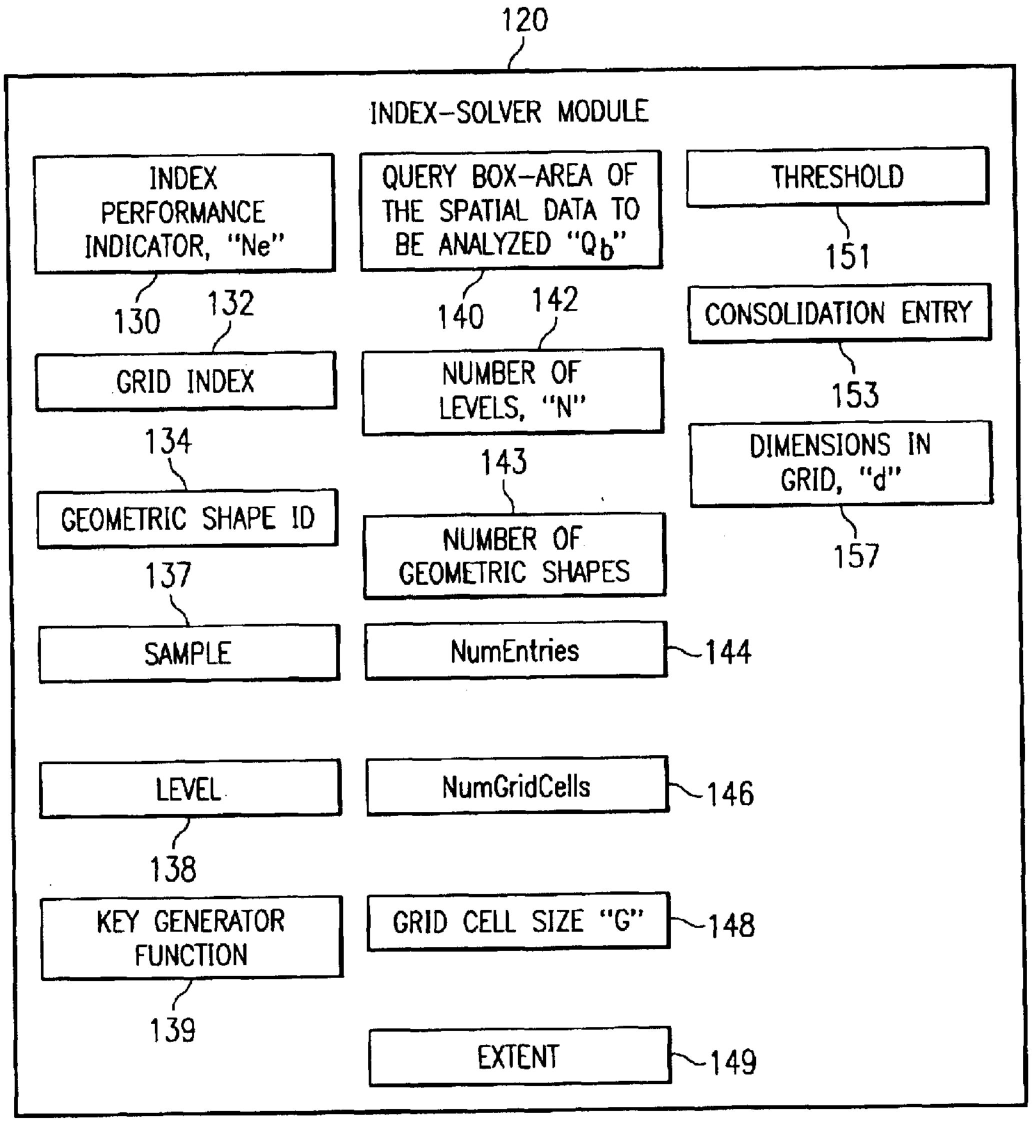
FIG. 1B is a block diagram that illustrates the index-solver module.

FIG. 1B is a block diagram that illustrates the index-solver module 120. The index performance indicator Ne 130 is used by the index-solver module 120 to evaluate the grid index performance. By evaluating the grid index performance the present invention provides a technique for improving searches that use grid-indexing techniques and operate on spatial data 124. Grid indexes 132 are used to search spatial data 124. A particular set of samples of geometric shape information 137 are found and analyzed to determine the index performance indicator Ne 130. In the preferred embodiment of the present invention thirty samples 137 are taken. Element 124 is described with reference to FIG. 1A.

A technique for partitioning space into grids 202 may include ascribing different levels 138 to the partitioned space. The levels 138 may represent partitions of the space at various resolutions of the cells 206 of the grid 202. The preferred embodiment of the present invention operates on a plurality of such levels 138. The variable "N," represents the number of grid levels 142. If the number of grid cells 146 exceeds a user-defined threshold 151 the next level 138 of information is determined. Element 124 is described with reference to FIG. 1A and elements 202, 204, and 206 are described with reference to FIG. 2A.

Figure 2:
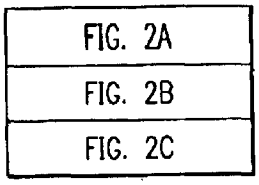
FIG. 2 includes FIG. 2A, FIG. 2B, and FIG. 2C.

A geometric shape identifier (ID) 134 is used during the operation of the present invention to identify a geometric shape 204 so that the information associated with the geometric shape 204 may be indexed. The geometric shape ID 134 and the associated level 138 information are combined into the geometric shape ID 134 that is a single, unique value. The single, unique value is identified with the associated grid cell 206. The preferred embodiment of the present invention uses an SQL query that calls a "key generator" function 139 to create the index entries 273 associated with each geometric shape 204. Element 273 is described with reference to FIG. 2.

The determination of the index performance indicator Ne 130 is completed by use of other values, such as those that follow. The query box area "$Q_b$," 140 is the average size of the area that is analyzed. The number of geometric shapes 204 that overlap a query box $Q_b$ 140 may be determined. The area covered by $Q_b$ 140 may be smaller than the size of the extent of data that is analyzed 149. Further, the number of index entries 144 in the data index structure 251 is determined. Also, the number of grid cells 146 that overlap with any geometric shape 204 is determined. The grid cell size, "G," 148 is also used to determine the index performance indicator Ne 130. The extent of the data to be analyzed, the "extent," 149 is also used during the implementation of the present invention. The number of different geometric shapes 143 is also determined. The value, "d," 157 represents the dimension of the grid 202 and is used to determine Ne 130. The consolidation entry 153 is the number of geometric shapes that overlap with the same number of grid cells 206 and is used in an implementation of the present invention when more than one level, "i," 138 is analyzed. Element 251 is defined with reference to FIG. 2.

Figure 2A:
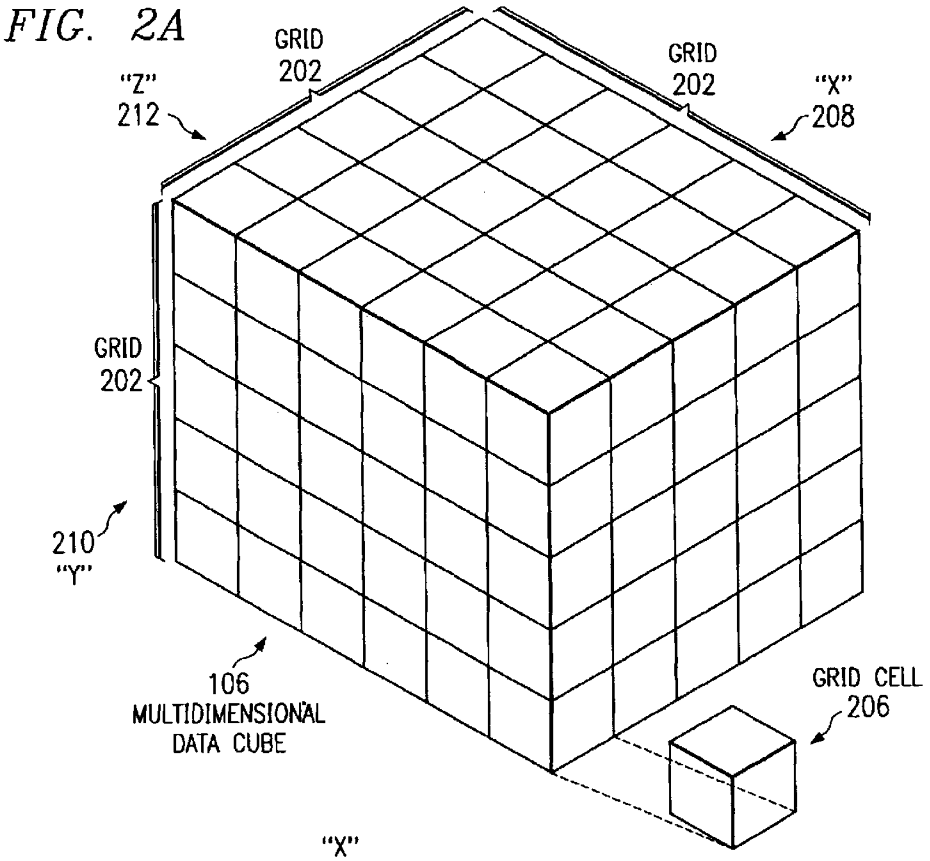
FIG. 2A is a block diagram of a multidimensional data cube that is suitably configured for operation with the present invention.

As shown in FIG. 2A a multidimensional data cube 106 is suitably configured for operation with the present invention. Therefore, by means of explanation, an example of the operation of the present invention is described. As shown in FIG. 2A, the preferred embodiment of the present invention novelly determines an efficient size for the grid cells 206 by finding the minimum value of an index performance indicator Ne 130. A grid 202 represents the decomposition of data into units that may be uniform or of varying size. A grid cell 206 is a specific instance of a unit contained within a grid 202. Specific examples of grids 202 include the "X" dimension grid that is shown in element 208, the "Y" dimension grid that is shown in element 210, and the "Z" dimension grid that is shown in element 212. Element 130 is described with reference to FIG. 1B.

Figure 2B:
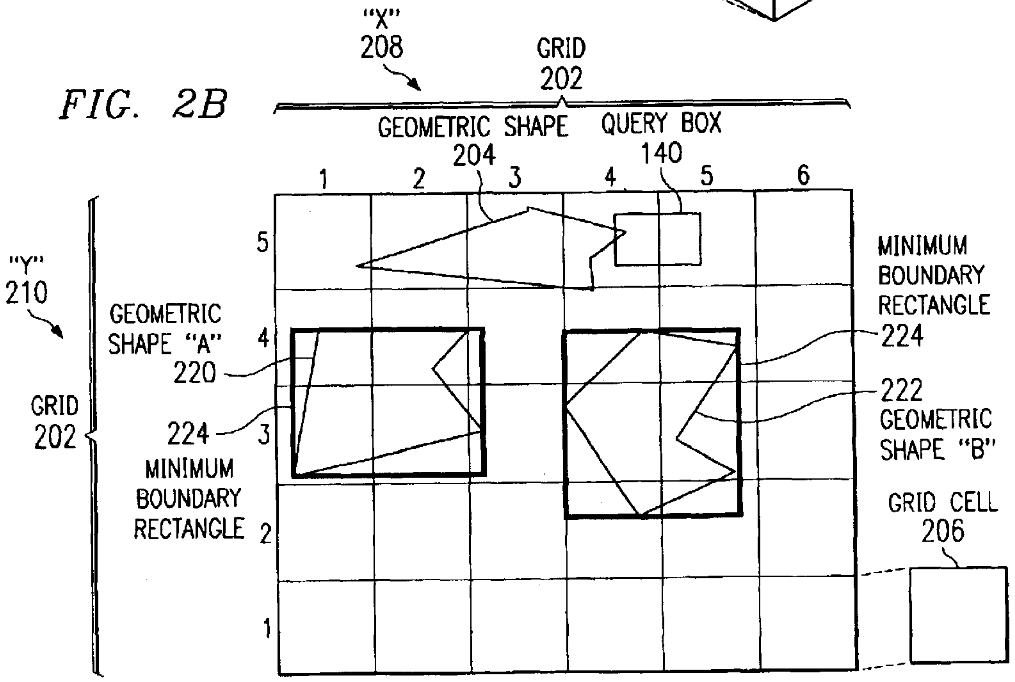
FIG. 2B is a block diagram that illustrates the grid.

FIG. 2B illustrates a two-dimensional grid 202. The preferred embodiment of the present invention operates on spatial data 124 that is information that represents geometric shapes 204. The two-dimensional grid 202 includes examples of an X dimension grid 208 and a Y dimension grid 210. Further, the X dimension grid 208 includes six units and the Y dimension grid 210 includes five units. The two-dimensional grid 202 includes grid cells 206 that may be referenced by the units of the X dimension grid 208 and the Y dimension grid 210. The geometric shape "A" as shown in element 220 and the geometric shape "B" as shown in element 222 are each bounded by a minimum boundary rectangle 224. The variable $Q_b$ 140 represents a query box size and in this example $Q_b$ 140 overlaps two grid cells 206. Element 124 is described with reference to FIG. 1.

Figure 2C:
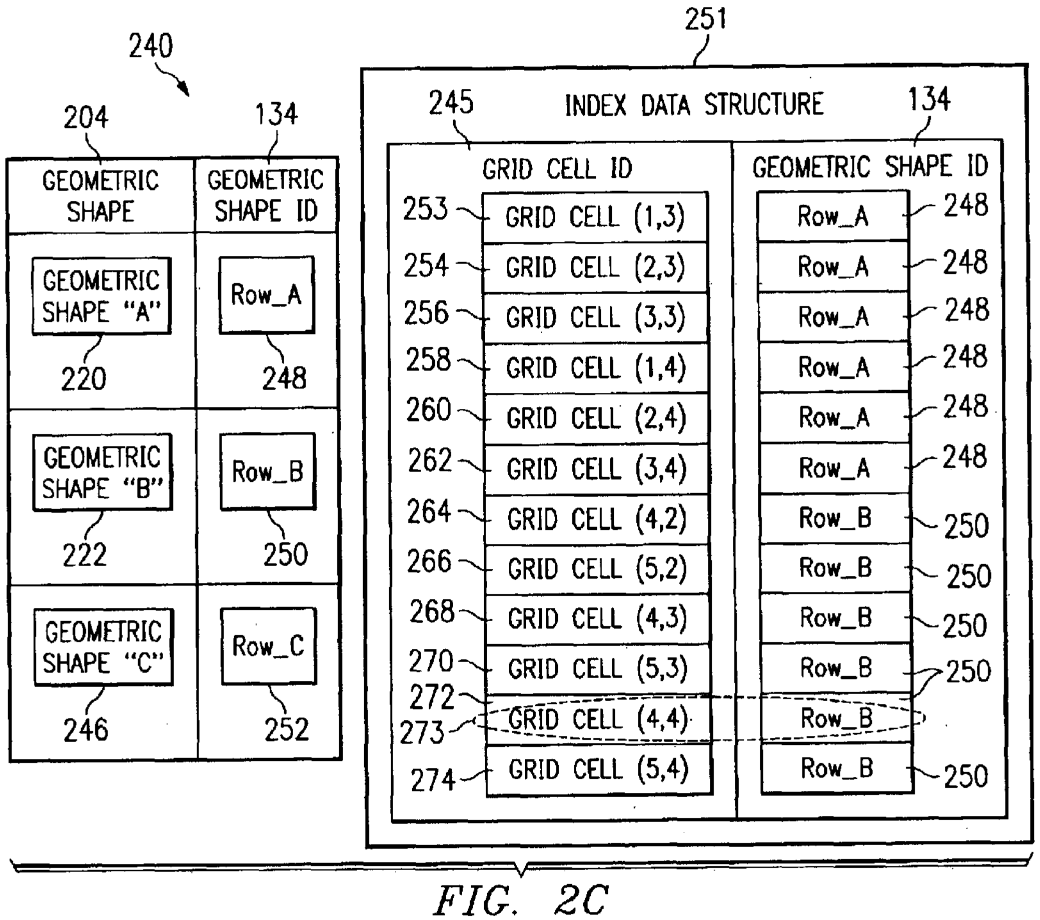
FIG. 2C is a block diagram that illustrates the SQL table and the index data structure.

FIG. 2C is a block diagram that illustrates the SQL table 240 and the index data structure 251. The preferred embodiment of the present invention uses an SQL statement to generate the index data structure 251 that includes geometric shape ID's 134 and grid cell ID's 245.

For example, the geometric shape A as shown in element 220, is associated with the Row_A geometric shape ID, as shown in element 248. Also, the geometric shape B as shown in element 222, is associated with the Row_B geometric shape ID, as shown in element 250. Further, the geometric shape C as shown in element 246, is associated with the Row_C geometric shape ID, as shown in element 252.

The geometric shape ID 134 and the grid cell ID 245 may be jointly used as an index to locate a specific geometric shape 204. The term, "index," as used herein is a set of pointers that are logically ordered by the values of a database key. The term "database key" as used herein is a column or an ordered collection of columns that are identified in the description of a table, index, or referential constraint. Indexes provide quick access to data and can enforce uniqueness on the rows in the table. A table is a named data object consisting of a specific number of columns and a set of rows. An index entry 273 is an entire row in the index data structure 251 and includes a grid cell ID 245 and a geometric shape ID 134.

The index data structure 251 is used to associate each grid cell 206 that overlaps with a geometric shape 204 thereby enabling searches of the information associated with a geometric shape 204. For example, geometric shape A, as shown in element 220, overlaps will the following grid cells 206: grid cell (1,3) as shown in element 253, grid cell (2,3) as shown in element 254, grid cell (3,3) as shown in element 256, grid cell (1,4) as shown in element 258, grid cell (2,4) as shown in element 260, and grid cell (3,4) as shown in element 262. Elements 253, 254, 256, 258, 260, and 262 overlap with geometric shape A 220 and are therefore associated with Row_A geometric shape ID, as shown in element 248. Element 206 is described with reference to FIG. 2A.

Similarly, geometric shape B, as shown in element 222, overlaps will the following grid cells 206: grid cell (4,2) as shown in element 264, grid cell (5,2) as shown in element 266, grid cell (4,3) as shown in element 268, grid cell (5,3) as shown in element 270, grid cell (4,4) as shown in element 272, and grid cell (5,4) as shown in element 274. Elements 264, 266, 268, 270, 272, and 274 overlap with geometric shape B 222 and are therefore associated with Row_B geometric shape ID, as shown in element 250.

Figure 3A:
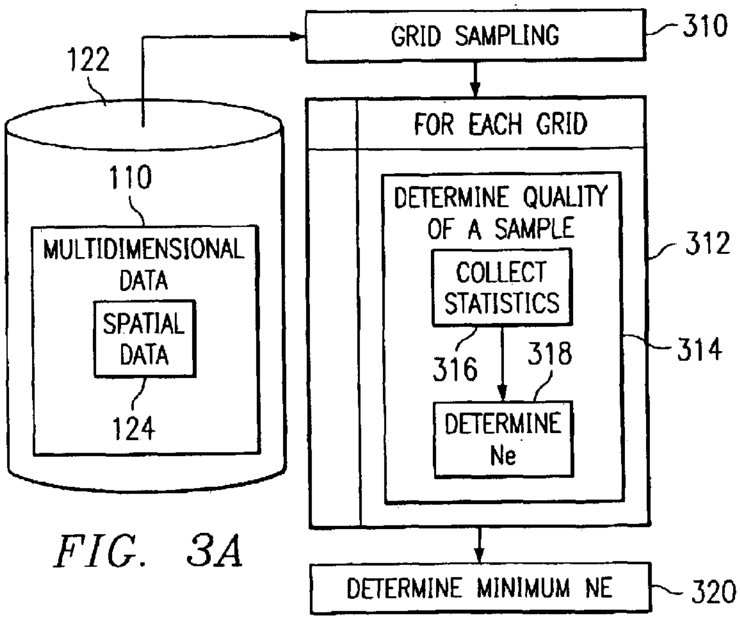
FIG. 3A is a flow diagram that illustrates the method of present invention.
Figure 3:
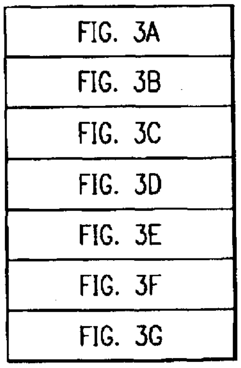
FIG. 3 includes FIG. 3A, FIG. 3B, FIG. 3C, FIG. 3D, FIG. 3E, FIG. 3F, and FIG. 3G.

FIG. 3A illustrates the method of the preferred embodiment of the present invention that determines by a more efficient technique over techniques of the past the value of a grid index 132 that is typically the minimum value of the index performance indicator Ne 130, and that is used in searching a multidimensional database 110. More particularly, the preferred embodiment of the present invention performs grid-indexing searches on spatial data 124 that may be stored on a disk 122. The method comprises: (a) sampling the grids 202, as shown in element 310; (b) as shown in element 314, and for each grid 312, determining the quality of a sample 137, by: (i) collecting statistics, as shown in element 316, and (ii) determining Ne 130 as shown in element 318; and (c) as shown in element 320 determining the minimum Ne 130 and the corresponding size of the grid cell 148. In the preferred embodiment of the present invention the quality of a sample 314 is determined with respect to other samples 137. It will be appreciated that the method described herein is exemplary and other equivalent methods that determine "Ne" 130, and more particularly the minimum value of "Ne" 130, in order to determine the grid cell size 148 may be used to practice the present invention. The method will be described in more detail with reference to FIGS. 3B-3F. Elements 130, 132, 137, and 148 are described with reference to FIG. 1, and elements 202 and 206 are described with reference to FIG. 2.

Figure 3B:
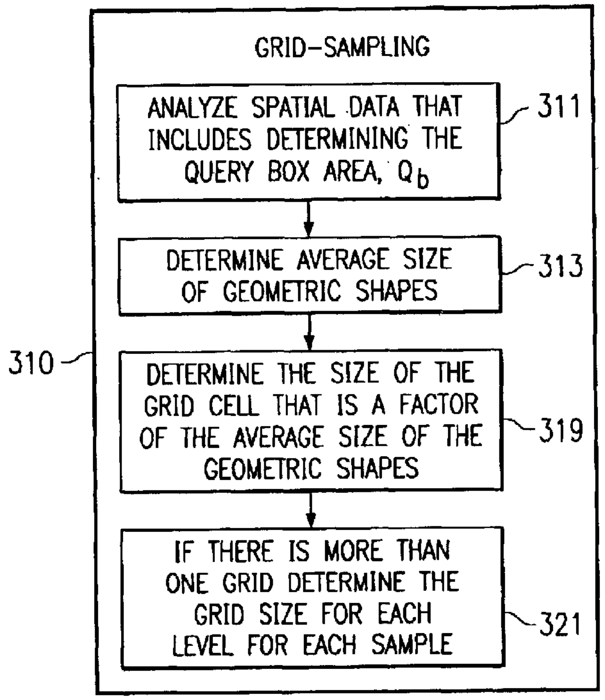
FIG. 3B is a flow diagram that illustrates grid sampling.

FIG. 3B illustrates grid-sampling 310. In the preferred embodiment of the present invention thirty samples 137 are taken. This number may be determined by analysis of experimental data and may be set by the user via the user interface 117. As shown in element 311, the spatial data 124 is analyzed. This includes determining the query box area $Q_b$, 140 of the spatial data 124 to be analyzed. Then as shown in element 313, the average size of the geometric shapes 204, is determined. Elements 117, 124, 137, and 140 are described with reference to FIG. 1, and elements 202 and 204 are described with reference to FIG. 2.

Continuing, as shown in element 319, the preferred method of the present invention represents the size of the grid cell 148 for the first level 138 as a factor of the average size of the geometric shapes 204. Also, as shown in element 321, if there is more than one grid 202, the size of grid cells 206 for each grid 202 at each level 138 and for each sample 137 are determined, and is described in detail with reference to FIG. 3G. Elements 138, 148, and 149 are described with reference to FIG. 1, and element 206 is described with reference to FIG. 2.

Figure 3C:
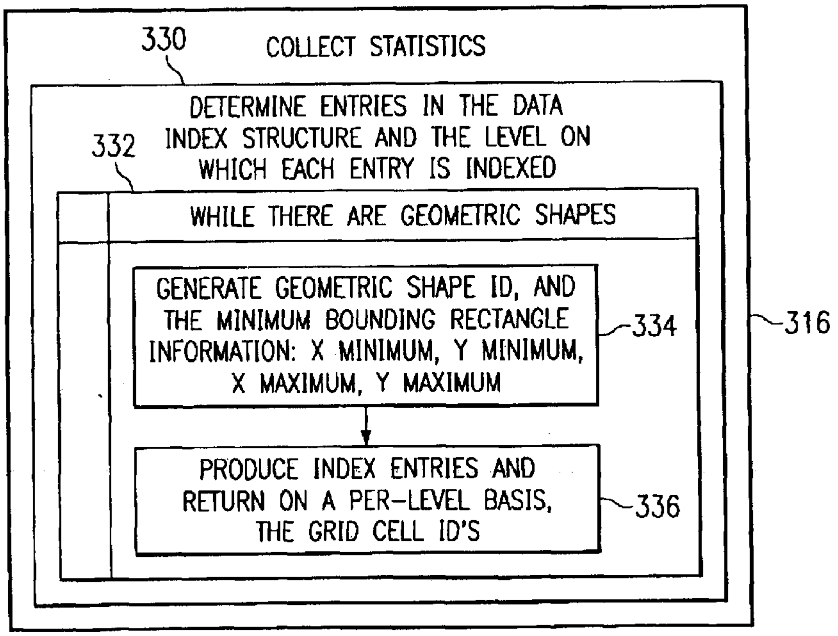
FIGS. 3C and 3D are flow diagrams that illustrate collecting statistics.
Figure 3D:
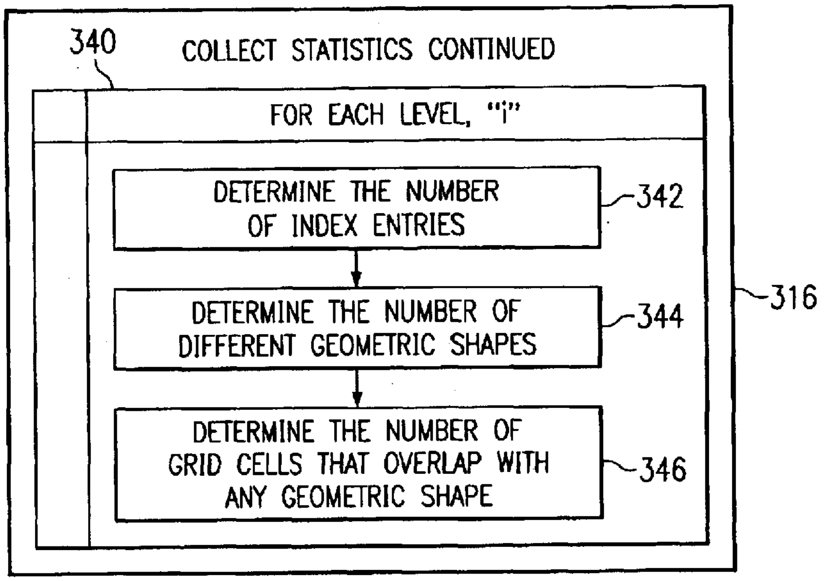

FIGS. 3C and 3D illustrate the process of collecting statistics 316 to simulate geometric shape ID's 134 and determine the number of geometric shape ID's 134 per grid cell 206, and is used in the preferred embodiment of the present invention. The preferred embodiment of the present invention generates the index data structure 251 by initiating a Structured Query Language (SQL) function that produces information that was used by the database application to initially construct the index entry 273. The index entry 273 is used to search the spatial data 124 via grid indexing. The preferred embodiment of the present invention uses an SQL query that calls a "key generator" function 139 associated with each geometric shape 204 in the table and generates all the associated index entries 273. The result is that the geometric shape ID's 134 that were initially generated are computed again, typically as they exist internally in a database, such as DB2®. The index entries 273 are now available for search and analysis of multidimensional data 110. Elements 110, 124, 134, and 139 are described with reference to FIG. 1, and elements 204, 206, 251, and 273 are described with reference to FIG. 2.

By use of the SQL statement, the preferred embodiment of the present invention advantageously determines grid index entry values 273 without requiring disk 122 storage of such index entries 273. Therefore this improves the performance of determining the grid indexes 132 because there is minimal disk 122 storage overhead, or disk 122 access overhead associated with such techniques. This use of the SQL statement also improves the efficiency of collecting statistics in the sample 137 over techniques of the past. Further, the present invention is not restricted to spatial indexes and can be used for other techniques that construct and maintain indexes by use of a key generator function 139. Elements 122 and 132 are described with reference to FIG. 1.

The preferred embodiment of the present invention is an efficient technique for determining the minimum value of the index performance indicator Ne 130. It is highly efficient compared to techniques of the past for searching multidimensional data 110, which include time-consuming index creation processes. For instance, creating a grid-index 132 on a multidimensional database 110 with 100,000 rows may take as much as 30 seconds on a certain system 400. The system 400 used to generate this information is the computer system 400 marketed under the trademark Netfinity®. Typically, techniques of the past created hundreds of indexes to determine the size of grid cells 148 when a search of the database was performed. In the preferred embodiment of the present invention, up to 15 seconds on the same computer system 400 are needed to process the statistics collection SQL key generator function 139, and 30 sampling grid indexes 132 can produce a near optimal grid index 132. Elements 102, 110, 148, and 149 are described with reference to FIG. 1, element 206 is described with reference to FIG. 2A, and element 400 is described with reference to FIG. 4.

By means of example, a query follows that includes a select statement that calls a key generator function 139, and is used to produce the index data structure 251 for each level "i," as shown in element 138 (as shown in FIG. 1). A detailed discussion of the per-level techniques of the present invention is described with reference to FIG. 3F.

```
WITH envelopeGrid(level, geomID, xyID) AS
    ( SELECT level, geomID, CHAR(x) || '#' || CHAR(y)
      FROM    ( SELECT GENERATE_UNIQUE( ) AS geomID,
                    shape..xmin, shape..xmax,
                    shape..ymin, shape..ymax
              FROM      schema.table
              WHERE     shape IS NOT NULL )
            AS tab(geomId, xmin, xmax, ymin, ymax),
            TABLE ( db2gse.generate_grid(xmin, ymin,
                        xmax, ymax, grid1, grid2, grid3) )
            AS keyGen(level, x, y, gxn, gyn, gxx, gyx) )
SELECT level,
        COUNT(*) AS IndexEntries,
        COUNT (DISTINCT geomID) AS IndexedGeometries,
        COUNT (DISTINCT xyID) AS GridCells
FROM    envelopeGrid
GROUP BY level
```

As shown in element 330, the entries in the data index structure 251 and the levels, "i," 138 on which each geometric shape 204 is indexed are both determined. More particularly, as shown in element 332, while there are geometric shapes 204; a unique geometric shape ID 134 and the associated minimum-bounding rectangle information 224 are generated, as shown in element 334. In the preferred embodiment of the present invention, the minimum-bounding rectangle 224 information is generated concurrently with the geometric shape ID 134 and comprises: a minimum value and a maximum value for the X dimension grid 208 and the Y dimension grid 210. As shown in element 336, index entries 273 are produced and returned on a per-level basis. For each index entry 273, the geometric ID 134 is associated with a grid cell ID 245 that identifies a grid cell 206 that overlays the associated geometric shape 204. Elements 130 and 134 are described with reference to FIG. 1, elements 208, 210, and 224 are described with reference to FIG. 2B, and element 251 is described with reference to FIG. 2C.

The illustration of the method of collecting statistics 316 is continued in FIG. 3D. As shown in element 340, and for each level, "i," 138, a number of values are determined. The preferred embodiment of the present invention uses a threshold 151 of four to determine when a new level, "i," 138 should be used. Therefore, if more than four grid cells 206 overlap with a geometric shape 204 the next level, "i," 138 is used. As shown in element 342, the total number of index entries 144 of the data index structure 251 is determined. Also as shown in element 344, the number of different geometric shapes 143 is determined. The number of grid cells 146 that overlap with any geometric shape 204 is determined, as shown in element 346. The number of levels, N, 142 is also determined. Given that the size of the grid 202 is known, and the number of grid cells 206 and geometric shapes 204 that overlap is now known, the grid cell size $G_i$ 148 is now determined by sampling. Element 151 is described with reference to FIG. 1.

Figure 3E:
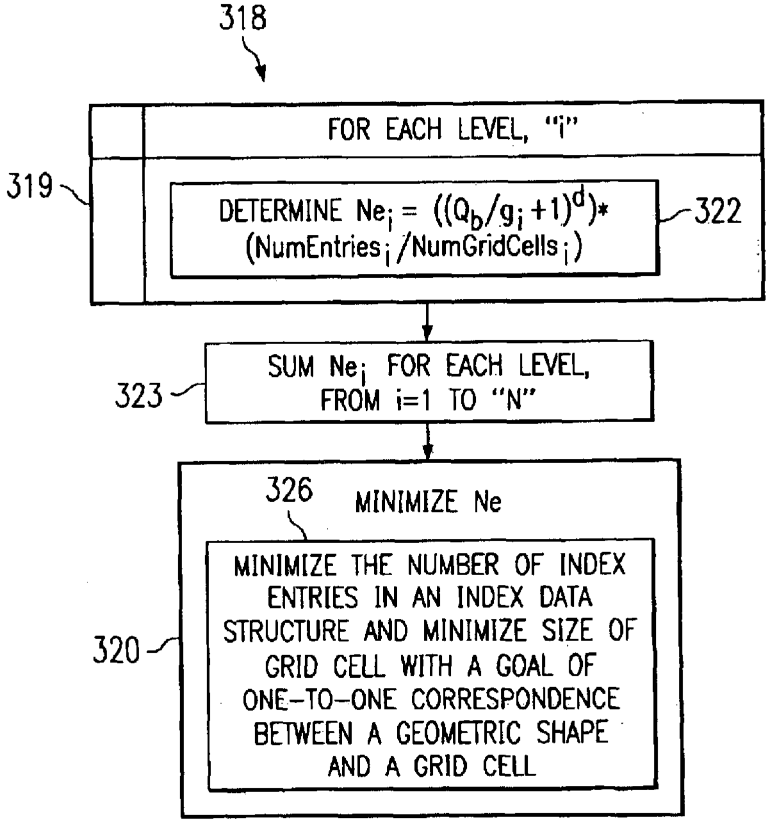
FIG. 3E is a flow diagram that illustrates determining Ne.

FIG. 3E illustrates, as shown in element 318, the method of determining the index performance indicator Ne 130. As shown in element 319, the performance indicator Ne 130 is determined for each of the samples 137 with information from each level, "i," 138. In the preferred embodiment of the present invention thirty samples 137 are used. Therefore thirty samples 137 with information about the geometric shapes 204 indexed on each level, "i," 138 and the index entries 273 associated with each geometric shape 204 are produced. The validity of the Ne 130 is determined experimentally and Ne 130 is defined in Equation One and is shown in element 322.

$$Ne=SUM(i=1 \text{ to } n)\,[((Q_b/G_i)+1)^d*(NumEntry_i/NumCell_i)] \quad (1)$$

The variable $Q_b$ 140 represents a query box size. More particularly, given a query box 140 that is a square, the variable $Q_b$ represents the length of a side of the square query box 140. Given that the variable G represents the grid cell size 148 on a per-level basis, the quotient $(Q_b/G_i)$ is the ratio of grid cells 206 that are approximated by a query box $Q_b$ 140. It is highly unlikely that a query box is aligned perfectly with the edge of a grid cell 206 therefore 1 is added to the quotient of $(Q_b/G_i)$ to reflect the likely overlap of a query box 140 with an additional grid cell 206. The value, "d," 157 represents the dimension of the grid 202. Since the preferred embodiment of the present invention operates on a two-dimensional grid, and uses a square query box 140, the resulting value of "d" is 2 and the value of $(Q_b/G_i+1)$ is squared. Therefore, the following represents the number of grid cells 206 that intersect with the query box $Q_b$ 140 associated with level, "i," 130: $(Q_b/G_i+1)^2$. Elements 124, 130, 137, 138, 140, 149, and 157 are described with reference to FIG. 1, and elements 202, 204, 206, and 273 are described with reference to FIG. 2.

The quotient, "$(NumEntry_i/NumGridCell_i)$," represents the number of entries 144 in the index data structure 251 divided by the number of grid cells 146 associated with the level, "i," 138, and that overlap with any geometric shape 204. The preferred embodiment of the present invention applies Equation One to geometric shapes 204 by treating the geometric shapes 204 as being uniformly distributed within two-dimensional space. Since the ratio is an abstraction that smoothes out differences in the data and is applied to areas that include data, the present invention applies equally well to areas that include a large amount of data or a small amount of data. Element 146 is described with reference to FIG. 1, and element 251 is described with reference to FIG. 2C.

The variable N represents the total number of grid levels 142. When N levels of indexes 142 are used, the index performance indicator Ne 130 for each level, "i," 138 is summed from "i=1 to N" as shown in element 323. A detailed discussion of the per-level techniques of the present invention is described with reference to FIG. 3F and FIG. 3G. Elements 142 and 151 are described with reference to FIG. 1B.

The index performance indicator Ne 130 is minimized as shown in element 320, and improves the performance of grid-indexing searches on multidimensional data 110, such as spatial data 124. More particularly, as the value of the Ne 130 is reduced, the number of search operations is reduced. That is, the number of index entries 273 to be searched is reduced. The preferred embodiment of the present invention decreases the time required for database search operations that use a grid index 132 over the past, and improves the spatial grid index 132 over the past by determining the minimum value of Ne 130 and the corresponding values of the grid cell size 148. Therefore as shown in element 326, the preferred embodiment of the present invention minimizes the number of index entries 144 in the index data structure 251 and minimizes the size of the grid cell 206 with a goal of one-to-one correspondence between a geometric shape 204 and a grid cell 206. Elements 110 and 132 are described with reference to FIG. 1.

Figure 3F:
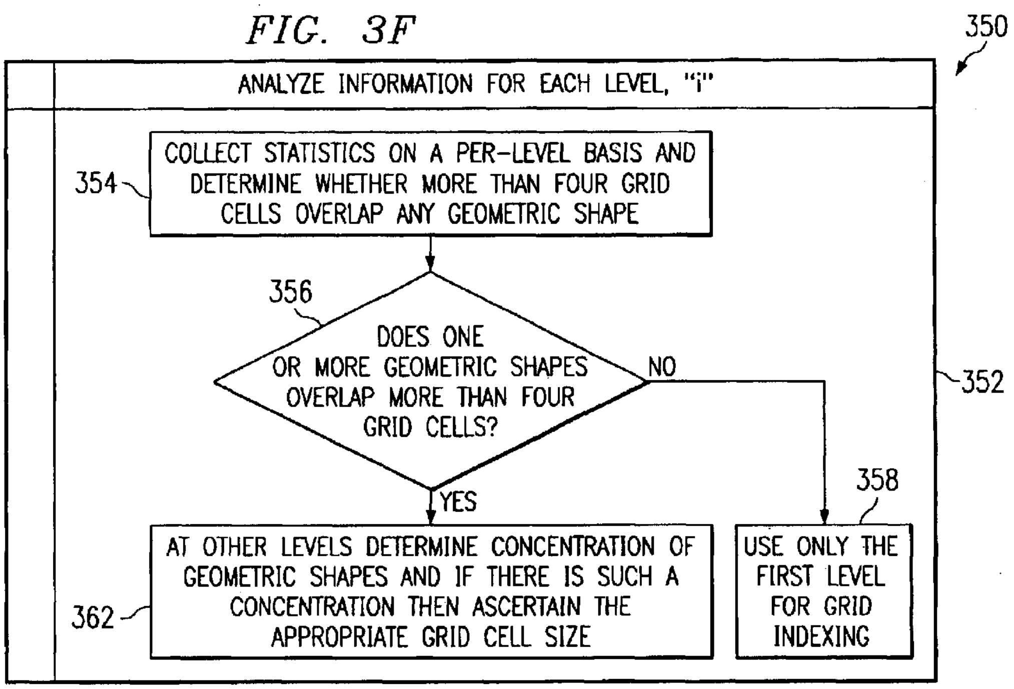
FIG. 3F is a flow diagram that illustrates the operation of the present invention on multiple levels.

Up to now operations on only one level, "i," 138 have been explicitly described. As shown in FIG. 3F and element 350, the preferred embodiment of the present invention operates with a plurality of levels, "i," 138. FIG. 3F describes an implementation of the present invention that determines when another level 138 is used. Element 138 is described with reference to FIG. 1.

The number of levels, N, 142 may be determined to ensure optimal operations with specific spatial data 124 and the invention may be practiced with any number of levels, N, 142. The preferred embodiment of the present invention operates by determining the grid cell sizes 148 associated with a sample 137 on a per-level basis using three levels 138, as shown in element 352. The preferred embodiment of the present invention operates efficiently if four or less grid cells 206 overlap with a geometric shape 204. Recall therefore that four is the threshold 151 of the preferred embodiment of the present invention. Elements 124, 137, 142, 149, and 151 are described with reference to FIG. 1, and elements 204 and 206 are described with reference to FIG. 2.

As shown in element 354, statistics are collected on a per-level basis and it is determined whether more than four grid cells 206 overlap with any geometric shape 204. As shown in the test of element 356, in one embodiment of the present invention if one or more geometric shapes 204 overlap more than four grid cells 206, then the next level 138 with a larger grid cell size 148 is used to practice the present invention. Therefore, if the result of the test of element 356 is "YES," then at other levels 142 a concentration of geometric shapes 206 is determined, as shown in element 362. If there is such a concentration then the appropriate grid cell size, $G_i$, 148 may be ascertained and is associated with the concentration of geometric shapes 206. The operation of element 362 is described in detail with reference to FIG. 3G. If the result of the test of element 356 is "NO," then the first level of analysis is used for grid indexing, as shown in element 358. Elements 138 and 148 are described with reference to FIG. 1B.

Figure 3G:
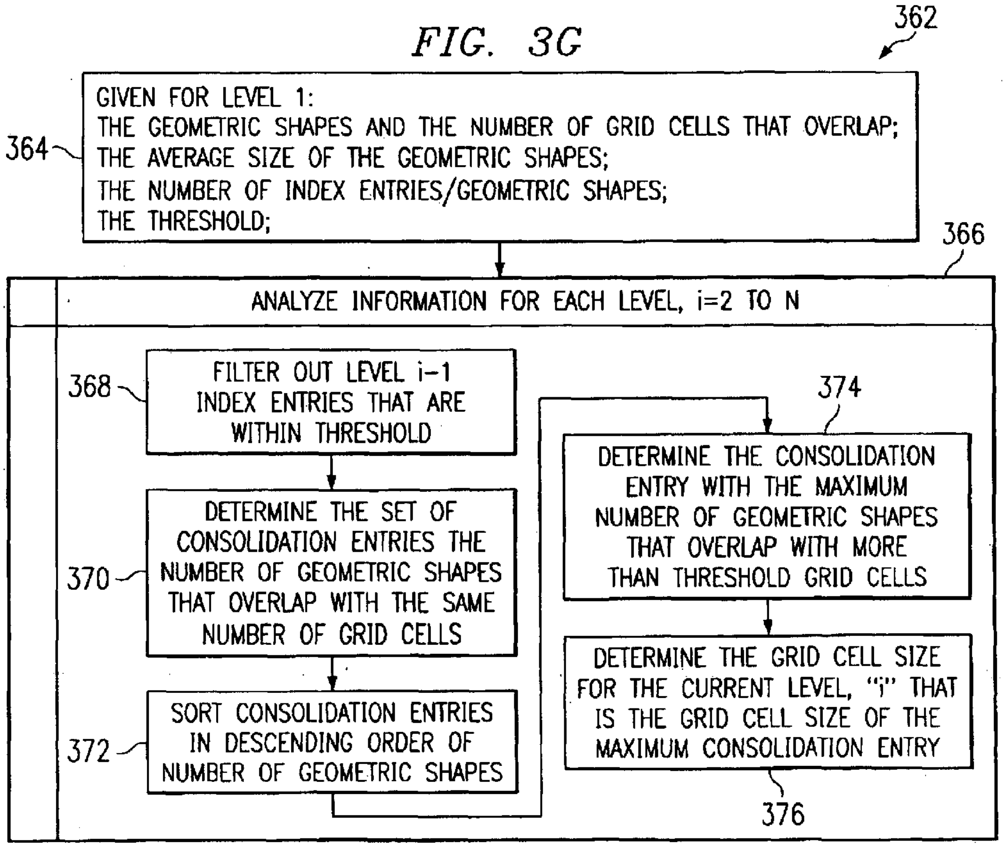
FIG. 3G is a flow diagram that illustrates determining concentration of geometric shapes.

FIG. 3G and element 362 describe the operation of determining the appropriate per-level grid cell size, "$G_i$," 148 given a concentration of geometric shapes 204. The operation of FIG. 3G occurs after the determination of the grid cell size, "$G_i$," 148 for the first level 138. Therefore, certain values used in the operation of FIG. 3G are based on the analysis of the first level 138. As shown in element 364, the following first level 138 information is available: the geometric shapes 204 and the grid cells 206 they overlap; the average size of the geometric shapes 204; the number of index entries 273 per geometric shape 204; and the threshold 151. The number of index entries 273 per geometric shape 204 also represents the number of overlapping grid cells 206 per geometric shape 204. Elements 138, 148, and 151 are described with reference to FIG. 1, and elements 204 and 273 are described with reference to FIG. 2.

As shown in element 366, each level, "i," 138, where "i" starts at 2, is analyzed. Initially as shown in element 368, any index entries 273 that are addressed by the analysis of the previous level, "i−1," 138 and therefore are within the threshold 151 are filtered out of the current operation. Then the consolidation entry 153 is determined, as shown in element 370. The consolidation entry 153 is the number of geometric shapes 143 that overlap with the same number of grid cells 146. Elements 143 and 146 are described with reference to FIG. 1.

For example, as shown in Table 1: Consolidation Entries, three consolidation entries 153 are illustrated. The first consolidation entry 153 represents 7 geometric shapes 204 that overlap with 5 grid cells 206. The second consolidation entry 153 represents 20 geometric shapes 204 that overlap with 6 grid cells 206. The third consolidation entry 153 represents 2 geometric shapes 204 that overlap with 9 grid cells 206. Element 153 is described with reference to FIG. 1.

TABLE 1

Consolidation Entries

| | Number of Geometric Shapes | Number of Overlapping Grid Cells |
|---|---|---|
| First Consolidation Entry | 7 | 5 |
| Second Consolidation Entry | 20 | 6 |
| Third Consolidation Entry | 2 | 9 |

As shown in element 372, the consolidation entries 153 are sorted in descending order of number of geometric shapes 204. For example, as shown in Table 2: Sorted Consolidation Entries, the first sorted consolidation entry 153 represents 20 geometric shapes that overlap with 6 grid cells 206.

TABLE 2

Sorted Consolidation Entries

| | Number of Geometric Shapes | Number of Overlapping Grid Cells |
|---|---|---|
| First Sorted Consolidation Entry | 20 | 6 |
| Second Sorted Consolidation Entry | 7 | 5 |
| Third Sorted Consolidation Entry | 2 | 9 |

Now, the consolidation entry 153 with the maximum number of geometric shapes 204 is determined, as shown in element 374. Therefore, as shown in Table 2, the First sorted consolidation entry 153 represents the maximum number of geometric shapes 143 and in this example represents 20 geometric shapes that overlap with 6 grid cells 206. Now as shown in element 376, the grid cell size, $G_i$, 148 is determined for the current level, "i," 138 that is the grid cell size, G, 148 of the maximum consolidation entry 153. Given the grid cell size, $G_{i-1}$, of level i−1 and the number of overlapping grid cells 206, the size of the geometric shapes 204 that overlap a particular number of grid cells 206 may be determined. The operation of element 362 may continue with an unlimited number of levels, "i," 138, as shown in element 366. Element 148 is described with reference to FIG. 1.

Figure 4:
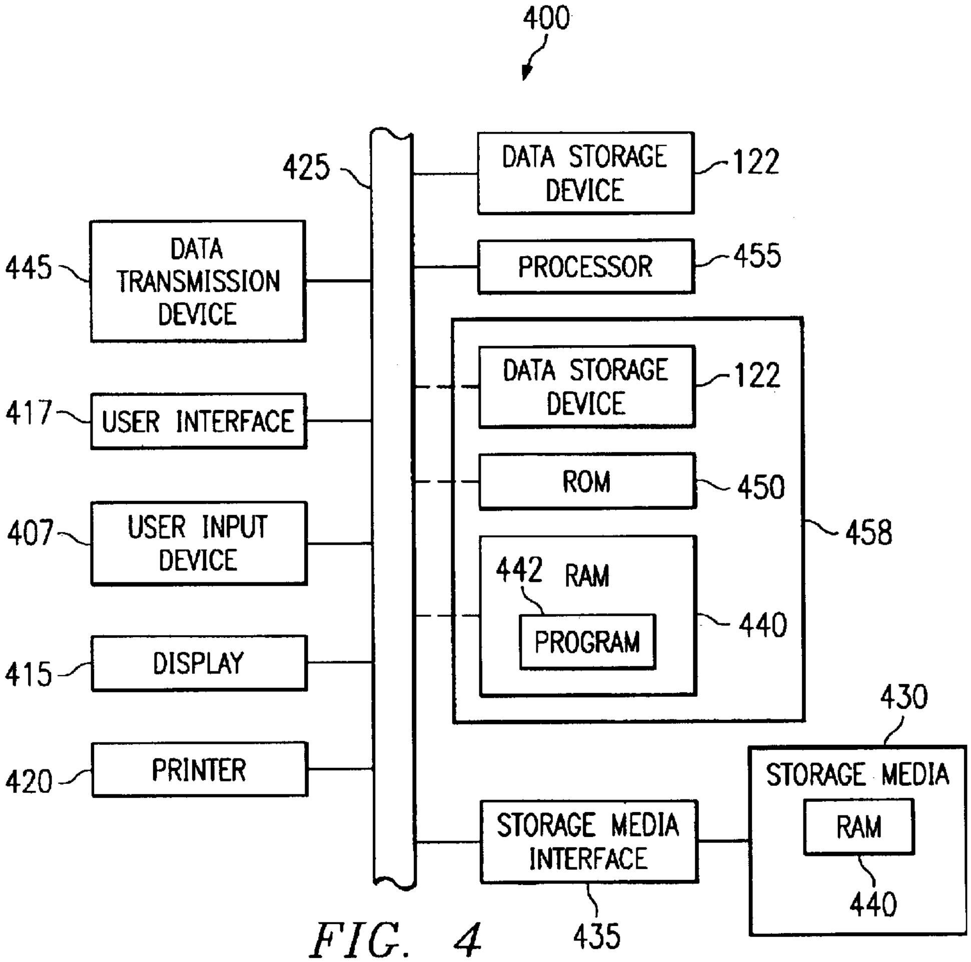
FIG. 4 is a block diagram of a computer system suitably configured for employment of the present invention.

FIG. 4 is a block diagram of a computer system 400, suitable for employment of the present invention. System 400 may be implemented on a general-purpose microcomputer, such as one of the members of the IBM Personal Computer family, or other conventional workstation or graphics computer devices, wireless devices, or mainframe computers. In its preferred embodiment, system 400 includes a user interface 417, a user input device 407, a display 415, a printer 420, a processor 455, a read only memory (ROM) 450, a data storage device 122, such as a hard drive, a random access memory (RAM) 440, and a storage media interface 435, all of which are coupled to a bus 425 or other communication means for communicating information. Although system 400 is represented herein as a standalone system, it is not limited to such, but instead can be part of a networked system. For example, the computer system 400 may be connected locally or remotely to fixed or removable data storage devices 122 and data transmission devices 445. Further the computer system 400, such as the server computer system 102 or the client computer system 104, also could be connected to other computer systems via the data transmission devices 445. Elements 102 and 104 are described with reference to FIG. 1A.

The RAM 440, the data storage device 122 and the ROM 450, are memory components 458 that store data and instructions for controlling the operation of processor 455, which may be configured as a single processor or as a plurality of processors. The processor 455 executes a program 442 to perform the methods of the present invention, as described herein.

While the program 442 is indicated as loaded into the RAM 440, it may be configured on a storage media 430 for subsequent loading into the data storage device 122, the ROM 450, or the RAM 440 via an appropriate storage media interface 435. Storage media 430 can be any conventional storage media such as a magnetic tape, an optical storage media, a compact disk, or a floppy disk. Alternatively, storage media 430 can be a random access memory 440, or other type of electronic storage, located on a remote storage system.

Generally, the computer programs and operating systems are all tangibly embodied in a computer-usable medium, such as the memory 458, the data storage device 122, or the data transmission devices 445, thereby making an article of manufacture, such as a computer program product, according to the invention. As such, the terms "computer program product" as used herein are intended to encompass a computer program 442 accessible from any computer readable device or media.

Moreover, the computer programs 442 and operating systems are comprised of instructions which, when read and executed by the computer system 400, cause the computer system 400 to perform the steps necessary to implement and use the present invention. Under control of the operating system, the computer programs 442 may be loaded from the memory 458, the data storage device 122, or the data transmission devices 445 into the memories 458 of the computer system 400 for use during actual operations. Those skilled in the art will recognize many modifications may be made to this configuration without departing from the scope of the present invention.

The user interface 417 is an input device, such as a keyboard or speech recognition subsystem, for enabling a user to communicate information and command selections to the processor 455. The user can observe information generated by the system 400 via the display 415 or the printer 420. The user input device 407 is a device such as a mouse, track-ball, or joy-stick, which allows the user to manipulate a cursor on the display 415 for communicating additional information and command selections to the processor 455.

When operating in accordance with one embodiment of the present invention, the system 400 determines an index performance indicator Ne 130 to evaluate the grid index 132 performance, and includes a technique for improving grid-indexing searches that use grid indexes 132 and operate on multidimensional databases 110. The processor 455 and the program 442 collectively operate as a module for improving grid-indexing searches that operate on multidimensional databases 110. It will be appreciated that the present invention offers many advantages over prior art techniques. Elements 110 and 132 are described with reference to FIG. 1.

The present invention is typically implemented using one or more computer programs 442, each of which executes under the control of an operating system and causes the system 400 to perform the desired functions as described herein. Thus, using the present specification, the invention may be implemented as a machine, process, method, system, or article of manufacture by using standard programming and engineering techniques to produce software, firmware, hardware or any combination thereof.

It should be understood that various alternatives and modifications can be devised by those skilled in the art. However, these should not be viewed as limitations upon the practice of these teachings, as those skilled in the art, when guided by the foregoing teachings, may derive other suitable characteristics of a similar or different nature. The present invention is intended to embrace all such alternatives, modifications and variances that fall within the scope of the appended claims

TRADEMARKS

IBM is a trademark or registered trademark of International Business Machines, Corporation in the United States and other countries.

DB2 is a trademark or registered trademark of International Business Machines, Corporation in the United States and other countries.

Netfinity is a trademark or registered trademark of International Business Machines Corporation in the United States and other countries.

What is claimed is:

1. A computer-implemented method for determining a grid index in a multidimensional database, comprising:

sampling a grid associated with said multidimensional database;

determining an index performance indicator associated with said sampled grid; and generating an improved said index performance indicator thereby determining said grid index, wherein said improved index performance indicator describes a number of index entries that are evaluated in said grid index during a search of said multidimensional database.

2. The computer-implemented method of claim 1 further comprising determining sizes for at least one grid cell associated with said sampled grid based on said improved index performance indicator.

3. The computer-implemented method of claim 1 wherein said improved index performance indicator is a minimum said index performance indicator.

4. The computer-implemented method of claim 1 further comprising determining said improved index performance indicator by using a key generator function.

5. The computer-implemented method of claim 4 further comprising:

said multidimensional database being a spatial said multidimensional database that represents at least one geometric shape;

using said key generator function to generate at least one index entry that is associated with said at least one geometric shape; and determining said improved index performance indicator when minimum said index entries are associated with each said at least one geometric shape.

6. The computer-implemented method of claim 1 further comprising determining said improved index performance indicator by using a query box.

7. The computer-implemented method of claim 1 wherein said multidimensional database is a spatial said multidimensional database.

8. A computer-implemented method for determining a grid index in a multidimensional database, comprising:

sampling a plurality of grids associated with said multidimensional database;

determining an index performance indicator associated with each said sampled grid; and generating an improved said index performance indicator that is the sum of said each grid index performance indicator thereby determining said grid index, wherein said improved index performance indicator describes a number of index entries that are evaluated in said grid index during a search of said multidimensional database.

* * * * *